United States Patent [19]

Proehl et al.

[11] Patent Number: 6,133,962
[45] Date of Patent: Oct. 17, 2000

[54] ELECTRONIC PROGRAM GUIDE HAVING DIFFERENT MODES FOR VIEWING

[75] Inventors: Andrew M. Proehl; Eduardo A. Sciammarella; Franklin Servan-Schreiber, all of New York, N.Y.

[73] Assignees: Sony Corporation, Tokyo, Japan; Sony Corporation of America, New York, N.Y.

[21] Appl. No.: 09/183,010

[22] Filed: Oct. 30, 1998

[51] Int. Cl.[7] ..................................................... H04N 5/50
[52] U.S. Cl. ............................................ 348/569; 348/906
[58] Field of Search ..................................... 348/569, 906, 348/563, 564; H04N 5/50, 5/445

[56] References Cited

U.S. PATENT DOCUMENTS 5,793,438  8/1998  Bedard ..................................... 348/569

Primary Examiner—Sherrie Hsia
Attorney, Agent, or Firm—Christopher M. Tobin

[57] ABSTRACT

An improved electronic programming guide (EPG) having time blocks capable of selectively expanding and contracting in size, according to a mode of the EPG, in order to facilitate fast and efficient time navigation through available programming by a viewer of multiple channel broadcast system. In one implementation, when a navigation element remains stationary over a time block for a period of time, a multiple program display mode is initiated, and the time block increases in size relative to other displayed time blocks. Responsive to the navigation element moving outside the time block, a navigation mode is initiated, wherein the time block as well as other displayed time blocks become equal in size, and display only the channel information for a particular channel segment.

23 Claims, 7 Drawing Sheets

| GUIDE | 12:30 | 1 | 1:30 | 2 | 2:30 | 3 | 3:20 PM | 3:30 | 4 | 4:30 | 5 | 5:30 |
|---|---|---|---|---|---|---|---|---|---|---|---|---|
| A&E 240 | | | | | | | Funny Face | | | | | |
| ABC 295 | | | | | | | Macho Man △ | | | | | |
| AMC 220 | | | | | | | Blue Velvet Crossfire | | | | | |
| BET 268 | | | | | | | Mirror Has ... | | | | | |
| BRAVO 238 | | | | | | | Larry King | | | | | |
| CBS 290 | | | | | | | WCW Wrest ... | | | | | |
| CMT 263 | | | | | | | ▽ Dumb and ... | | | | | |
| CNN-1 281 | | | | | | | World Report | | | | | |
| COMED 964 | | | | | | | ▽ I love Genie | | | | | |
| COURT 203 | | | | | | | Law & Order △ | | | | | |

FIG. 7

ELECTRONIC PROGRAM GUIDE HAVING DIFFERENT MODES FOR VIEWING

CROSS REFERENCE TO RELATED APPLICATIONS

The subject matter of the present application is related to copending U.S. application Ser. No. 09/183,008 (Docket No. 50L2272) and copending U.S. application Ser. No. 09/183,525 (Docket No. 50L2268), both filed contemporaneously with this application, assigned to Sony Corporation and to Sony Electronics, which are hereby expressly incorporated herein by reference.

FIELD OF THE INVENTION

This invention relates generally to the display of information on display screens, and more particularly to the presentation of channel, program, and broadcast information for a multiple channel television broadcast system.

BACKGROUND OF THE INVENTION

As the number and availability of broadcast channels for viewing on multiple channel television broadcast systems has continued to proliferate at an astonishing rate, the problem of navigating through the morass of available viewing selections has correspondingly become of more and more concern to the viewers of such systems. Today, programs, such as television broadcasting and Internet selections, are broadcast on televisions and computers on the airwaves, through cables, and via satellite. The sources of such programming today includes hundreds of stations.

Navigating through the great number of programs available for viewing is not an easy task. At the most basic level, a viewer may sequentially "channel surf" available channels by simply using the up or down channel key of a remote control device or the actual display screen, such as television or monitor, or the viewer may enter the desired channel directly into the remote or display if that is known. To assist in channel navigation, many broadcast systems and receivers provide electronic program guides (EPG) that allow the viewer to more easily and directly peruse the channels. Typically, EPGs employ a time-grid approach in which all of the available programming for a certain time period by channel is displayed.

A broadcast system may switch between an EPG and the program being broadcast or the EPG may just take up a portion of the available viewing area with the program continuing to be broadcast in the other portion of the screen. Given the limited resolution of television or monitor screens and the distance at which they are commonly viewed by viewers, navigating the EPG becomes difficult, even when the EPG is displayed "full-screen." Often only a relatively small window of programming, such as one and one-half hours, is displayed at one time in an effort to accommodate the limited resolution of the screen. When the viewer wishes to see programming beyond this window of programming, either prior to or after, a scrolling technique is often used.

As the viewer scrolls beyond the current screen to another time grid the screen display is completely updated and refreshed. The time required to refresh the screen can become tiresome to the viewer, particularly in cases where several time grids of the EPG are to be viewed. Additionally, this process can be somewhat confusing to the viewer who must try to remember the channel selections viewed on a previous view of the EPG. There currently exists a need in the art, therefore, to provide an improved EPG and method of channel surfing that will allow the viewer to quickly scan ahead or back in time.

SUMMARY OF THE INVENTION

It is accordingly an object of the invention to be able to quickly view available channel information of a multiple channel broadcast system.

It is further an object of the invention to quickly view available channel information in such a manner as to maximize the amount of information that is presented to the viewer at any given time.

Therefore, according to the present invention, a method and structure capable of displaying an electronic program guide (EPG) to a viewer of a multiple channel broadcast system is disclosed. Certain sizing changes of time blocks of the EPG are made in response to movement or non-movement of a navigation element, such as the cursor. In response to a navigation element of the multiple channel broadcast system remaining stationary over a time block of a plurality of time blocks of the electronic program guide for a predetermined period of time, a multiple program display mode in which the time block increases to a first size and the size of the rest of the plurality of time blocks decrease to a second, smaller size is entered. Also, in the multiple program display mode, channel information, such as the title of a program being displayed for each channel segment of the time block are displayed on a display screen of the system. In response to the navigation element of the system moving outside the time block, a navigation mode in which the time block decreases in size is entered and the rest of the plurality of time blocks increase in size so that each time block of the plurality of time blocks are of equal size and only channel information corresponding to a channel segment of the plurality of channel segments of the time block is displayed on the display screen. A viewer of the system controls navigation of the navigation element by means of a remote control device, a set-top box, or a computer system.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

The present invention presents an improved electronic programming guide having time blocks capable of selectively expanding and contracting in size, according to a mode of the EPG, in order to facilitate fast and efficient time navigation through a great number of available programming by a viewer of a multiple channel broadcast system.

The EPG is characterized as having a number of time blocks displayed on the display screen of the system, including a television screen or a monitor for instance, at any given time. Each time block is broken up into a number of channel segments, with each channel segment conveying information about the programming of that channel during the time defined by the time block. A navigation element, such as a cursor, that is easily controllable by a remote control device or a mouse of a computer system is also part of the EPG. The navigation element is used by the viewer of the system to view the EPG offerings.

At least two EPG modes are contemplated by the EPG of the invention. Both modes are defined by how and whether the navigation element is being moved by the viewer. If the viewer does not move the navigation element outside the current time block or moves the navigation outside the current time block, but only for a short period of time, then the EPG remains in a multiple-program title display mode. In the multiple-program title display mode, information, typically the title, of all of the programming available during the current time block is displayed. In order to display this program information, the current time block must be of a certain size in order to enable the viewer to readily see what programs are available, by channel, during the time period. It is noted that if the viewer is entering the multiple-program display mode, the current time block of the EPG will grow to the larger size and the channel information will be displayed.

Figure 1:
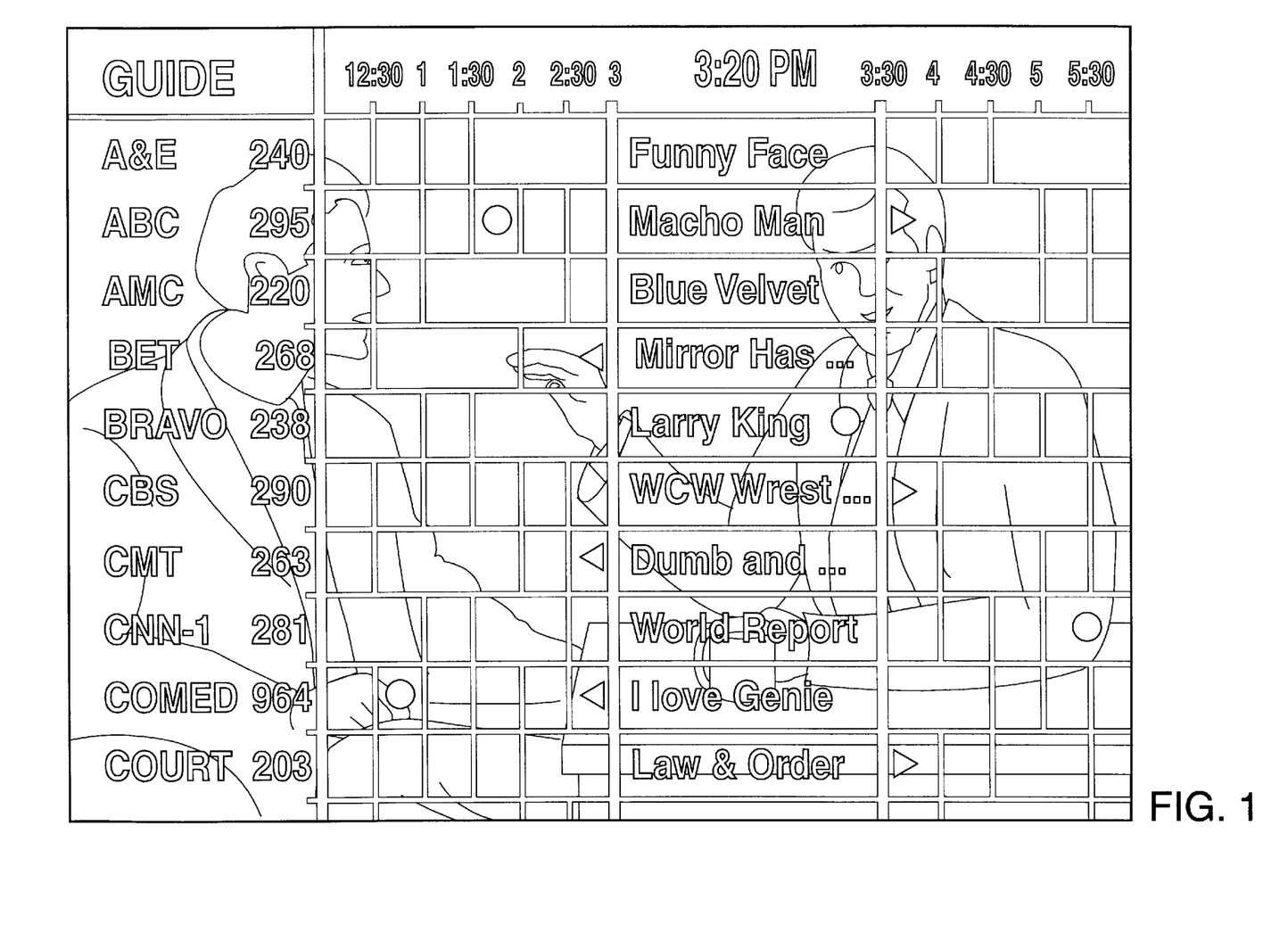
FIG. 1 illustrates a multiple program display mode of an electronic program guide, according to the present invention.

Referring now to FIG. 1, an example EPG in the multiple program display mode is illustrated. It can be seen that the current time block is the time block from 3 to 3:30 and is labeled, "3:20 PM". The time blocks in this example each have 10 channel segments, one for each of the ten channels displayed on the left of the EPG: A&E, ABC, AMC, BET, BRAVO, CBS, CMT, CNN-1, COMED, and COURT. For the current time block displayed in the figure, the following programming information, titles in this case, is provided for the ten segments: "Funny Face" in the A&E channel segment; "Macho Man" in the ABC channel segment; "Blue Velvet" in the AMC channel segment; "Mirror Has . . . " in the BET channel segment; "Larry King" in the BRAVO channel segment; "WCW Wrest . . . " in the CBS channel segment; "Dumb and . . . " in the CMT channel segment; "World Report" in the CNN-1 channel segment; "I Love Genie" in the COMED channel segment; and "Law & Order" in the COURT channel segment.

The second mode is the navigation mode. If the viewer moves the navigation element outside the current time block of the EPG and it remains outside the current block for a predetermined period of time, then the navigation mode is entered. The changes associated with entering the navigation mode from the multiple program display mode are designed to enhance fast and efficient navigation of the EPG. In response to the viewer navigating the navigation element outside the current time block for at least the predetermined period of time, the navigation mode is entered, causing the other time blocks to increase in size while the current time block decreases in size so that each time block of the EPG are the same size. Additionally, entering the navigation mode causes channel information to be displayed only for the channel segment over which the navigation element is positioned and that channel segment to be highlighted, as shown in FIG. 3.

Figure 2:
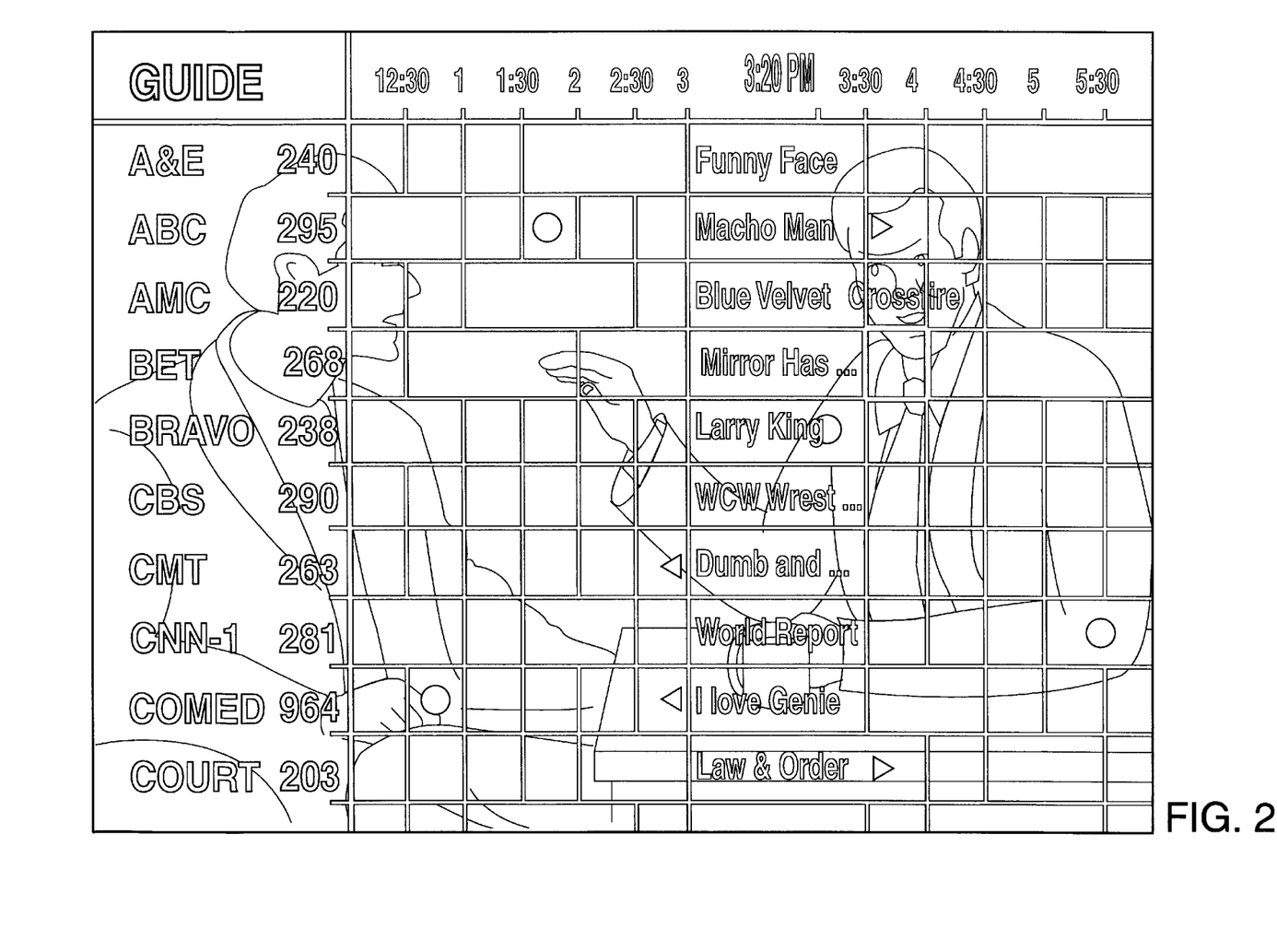
FIG. 2 illustrates a transition screen between the multiple program display mode and the navigation mode of the present invention.

In moving from the multiple program display mode to the navigation mode, or vice versa, an EPG transition occurs in which the program title area collapses horizontally like an accordion. This transition is illustrated in FIG. 2. It is noted that during the multiple program mode, the navigation mode, and the transition between multiple program display and navigation modes, the currently selected program continues to be displayed "underneath" the EPG and is viewable by the viewer as navigation through the EPG proceeds.

Figure 3:
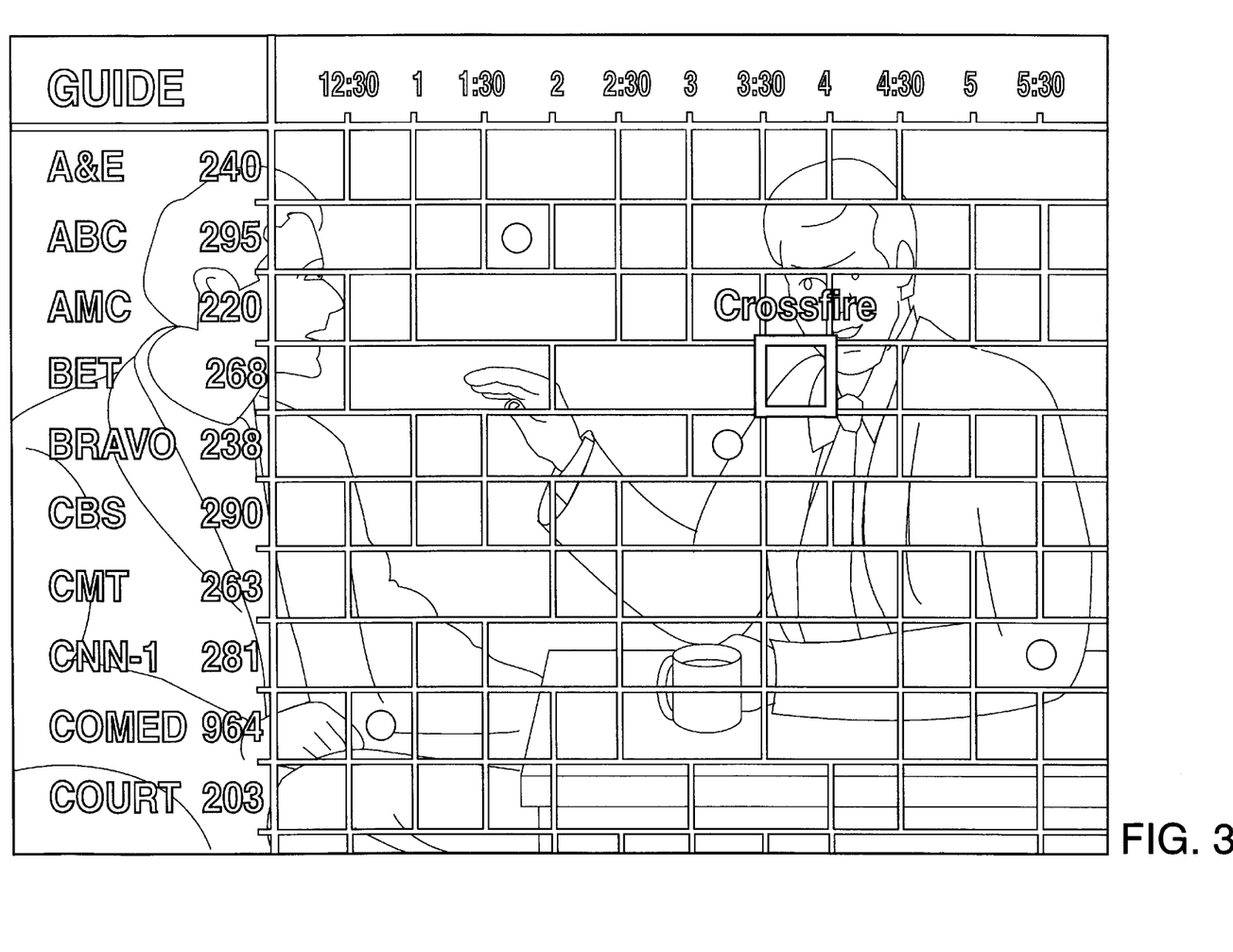
FIG. 3 illustrates a navigation mode of an electronic program guide, according to the present invention.

Referring now to FIG. 3, an example EPG in the navigation mode is illustrated. To go from the multiple program display mode of FIG. 1 to FIG. 3, the navigation element had to be moved outside the current time block for the predetermined period of time, such as 1 to 2 seconds. It can be seen that the current time block, from 3:30 to 4:00, has collapsed so that all of the time blocks shown are the same size. The program information is provided only for the highlighted program segment. In this case, the program information is the title "Crossfire" for the BET channel. No other program segment is highlighted or program information given.

Figure 4:
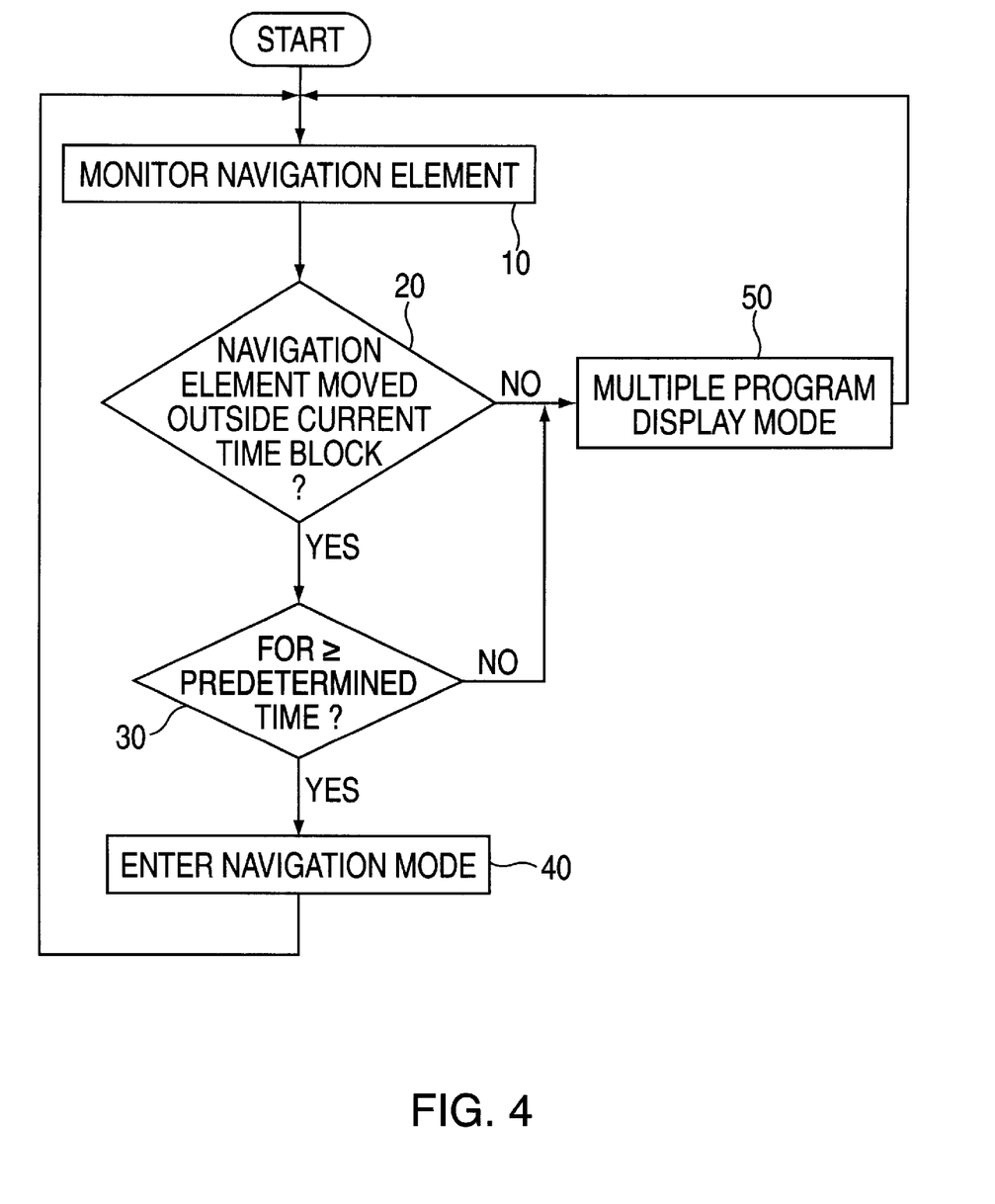
FIG. 4 illustrates a flowchart representative of the methodology of the present invention.

The methodology of the present invention is further illustrated by the flowchart of FIG. 4. In Block 10, the navigation element must be monitored for movement with respect to the current time block. Decision Block 20 inquires as to whether the navigation element has moved outside the current time block. If it has not, then the default mode of the EPG is the multiple program display mode of Block 50. If the navigation element has moved outside the current time block, the inquiry is whether it has remained outside the current time block for a certain period of time, as shown in Decision Block 30. If it has not, then the EPG remains in the multiple program display mode. If it has been outside the current time block for the required period of time, indicative of a desire of the viewer to navigate the EPG, then the navigation mode is entered at Block 40. It is further noted that this flow accounts for the possibility of going back and forth between the multiple program display and navigation modes since the output of Blocks 40 and 50 returns to the monitor navigation element Block 10.

Figure 5:
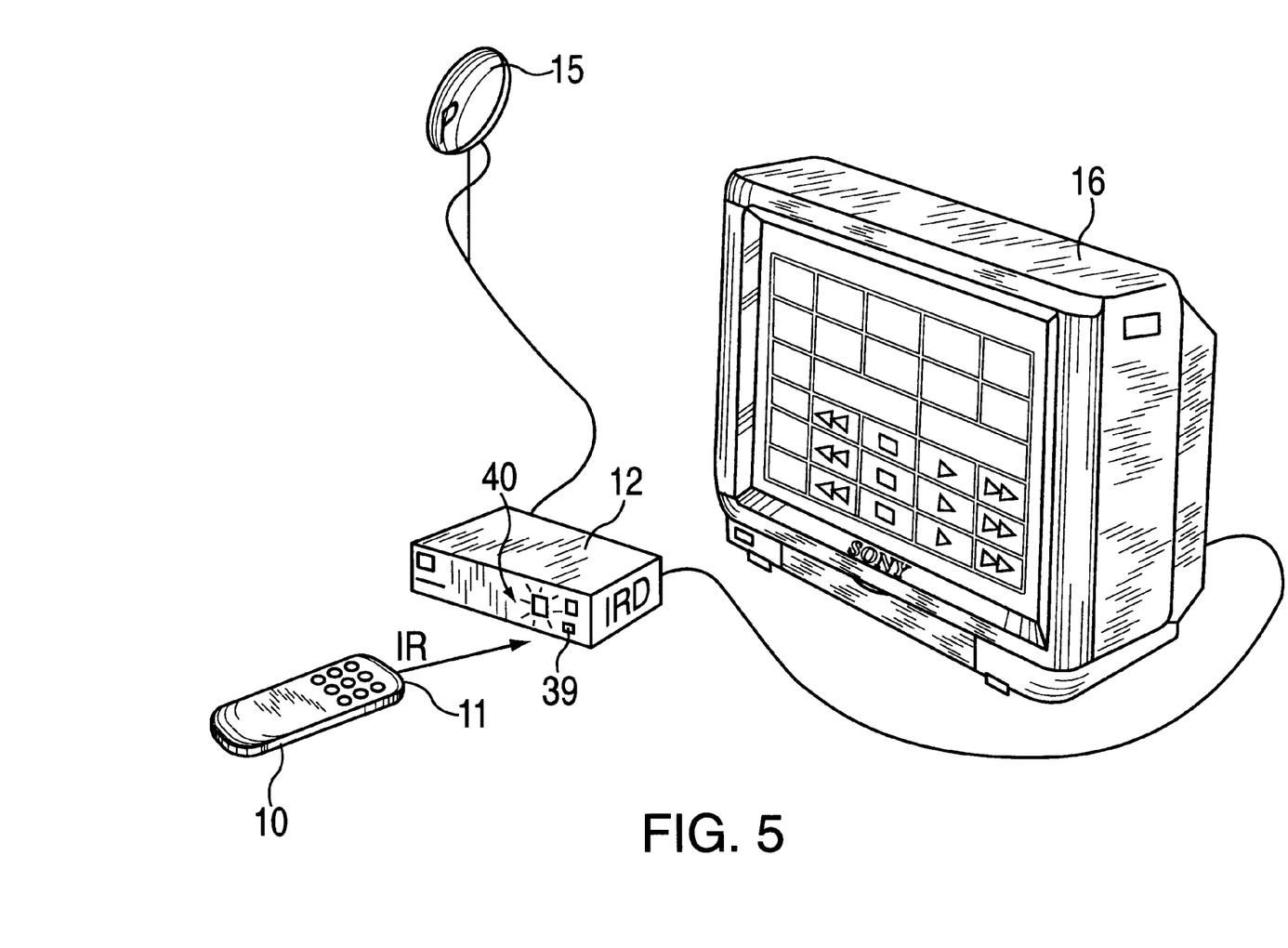
FIG. 5 illustrates a sample audio/visual (AV) system for use in conjunction with the present invention.
Figure 6:
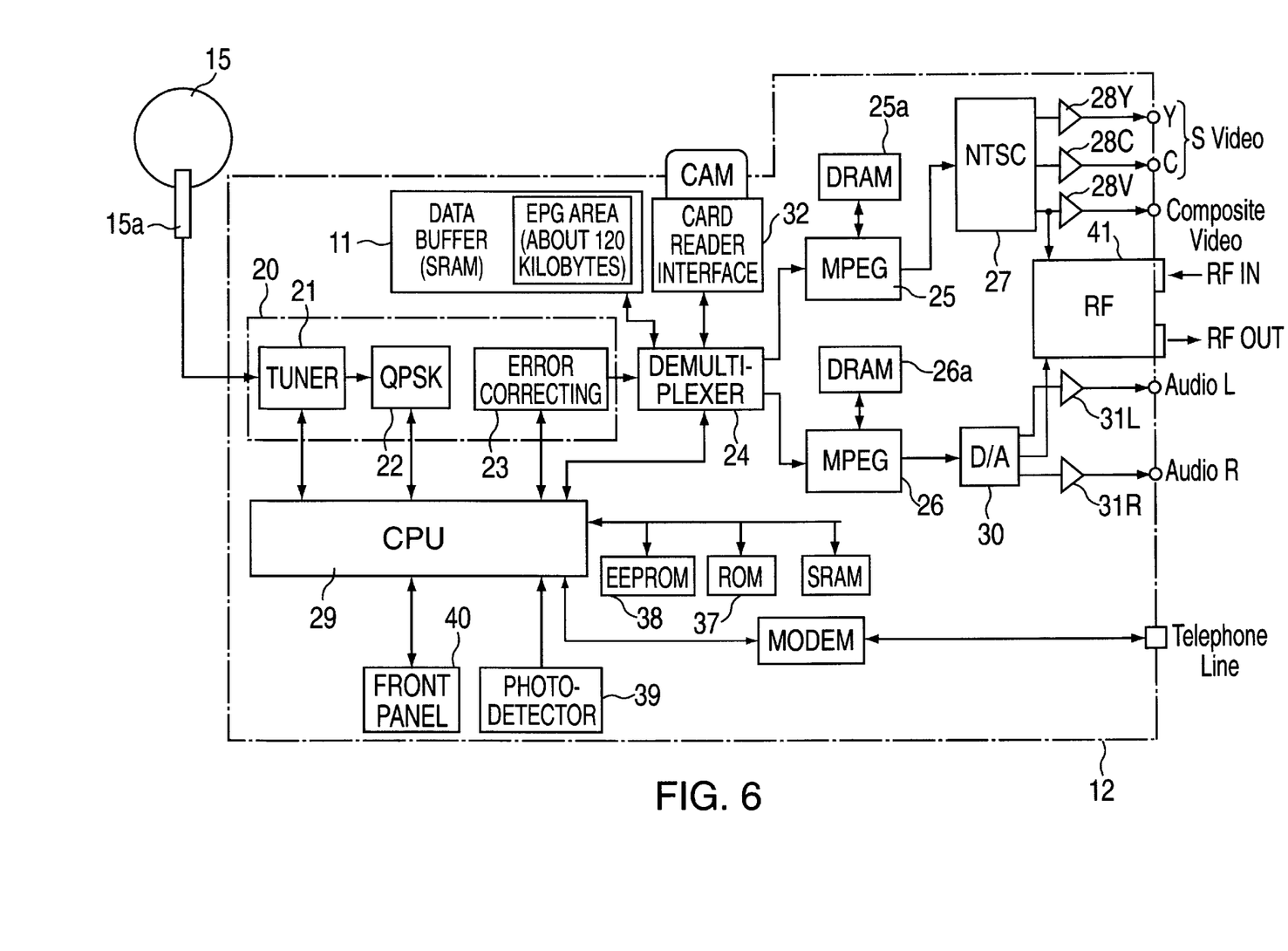
FIG. 6 illustrates a block diagram of the integrated receiver/decoder illustrated in FIG. 5.
Figure 7:
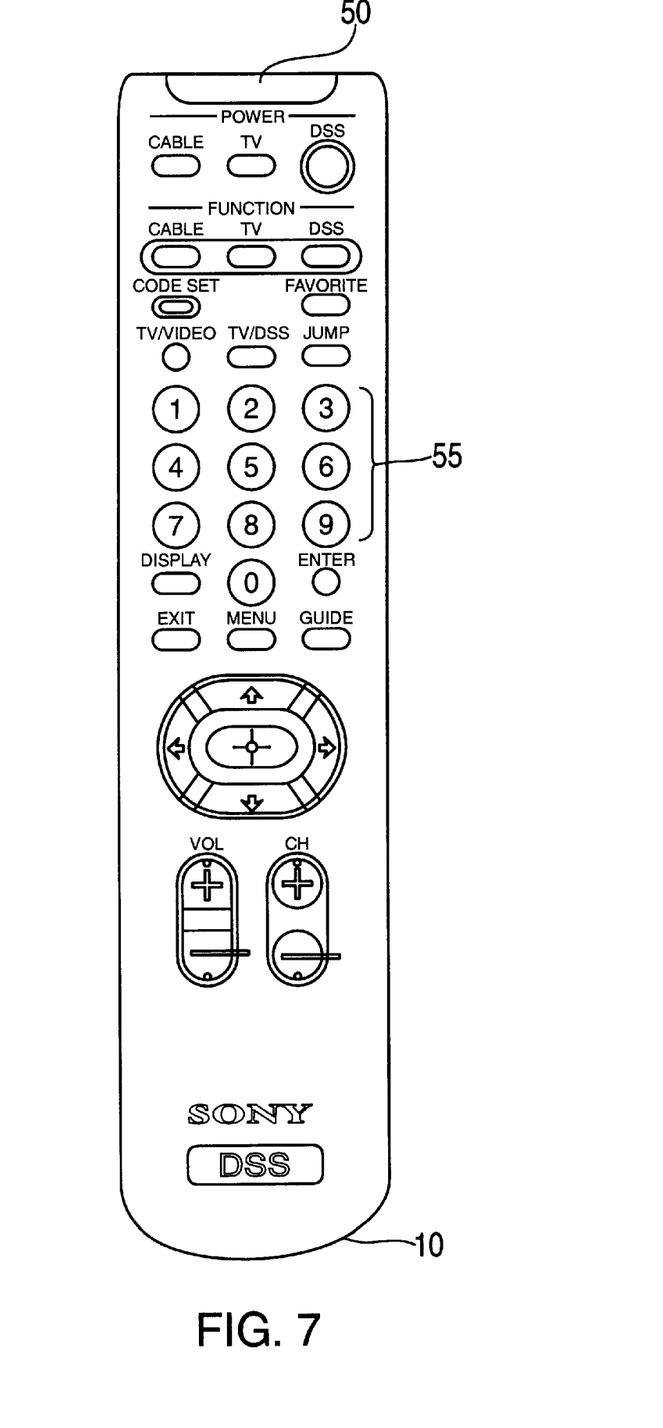
FIG. 7 illustrates a representative remote controller shown in FIG. 5.

The EPG of the present invention is used in conjunction with a multiple channel broadcast system. A Direct Satellite System (DSS) is representative of such a system and is shown in FIGS. 5 through 7. Referring now to FIG. 5, an example DSS is shown. The system has a remote controller 10 with data buffer 11, an integrated receiver/decoder 12 (IRD), commonly referred to as a "set-top box," an antenna 15, and a monitor 16. Packets of data are transmitted by a transponder of the satellite, with each transponder transmitting data in a time share manner at a predetermined frequency. A tuner of the IRD, shown as 21 of FIG. 6, is tuned to the frequency of the transponder corresponding to a channel designated by a viewer of the system and packets of digital data of that channel are received by the IRD 12.

Antenna 15 receives an encoded data signal sent from a satellite and the encoded data signal is decoded by IRD 12. Low noise block down converter 15a (LND) of antenna 15 converts a frequency of a signal sent from the satellite to another frequency. The converted signal is supplied to IRD 12 which in turn supplies a signal to monitor 16.

FIG. 6 illustrates a block diagram of IRD 12. A radio frequency (IR) signal output from LNB 15a of antenna 15 is supplied to a tuner 21 of a front-end block 20. The output from tuner 21 is supplied to a quadrature phase shift keying (QPSK) demodulation circuit 22 for demodulation. The output from QPSK demodulation circuit 22 is supplied to an error correcting circuit 23 for error correction. The data is received in encrypted and encoded, i.e. compressed, form.

Demultiplexer transport IC 24 stores the data stream, consisting of packets of data, received from error correcting circuit 23 of block 20 and directs portions of the data stream to the appropriate circuit for processing. The digital data stream sent from a satellite includes headers for classifying the different portions of the data in the digital data stream. The transport IC 24 stores the headers in registers and uses the headers to direct data. The data stream sent from the satellite, includes video data in the format specified by the Motion Pictures Expert Group standard (MPEG), MPEG audio data and electronic programming guide (EPG) data. Data that is identified by its header to be video data is transferred to MPEG video decoder 25. Data that is identified by its header to be audio data is transferred to MPEG audio decoder 26. Data that is identified to be EPG data is transferred to an area of data buffer 11 of the remote controller 10 that stores the EPG data.

Conditional access module (CAM), which typically includes a central processing unit (CPU), a read-only memory (ROM), and a random access memory (RAM), determines whether the user has the authorization to receive certain data, such as access to a pay TV station, using the authorization information stored in its memory. If the CAM determines that the user has the proper authorization for access, a key to decrypt the incoming data is provided to transport IC 24 which decrypts the data using the provided key. A smart card containing the key may be utilized, in which case the smart card is inserted into card reader interface 32.

The MPEG video and audio decoders, 25 and 26, respectively, each have a dynamic random access memory (DRAM) 25a and 26a that is used for buffering and storing data during processing by the associated decoder. The decoded digital video signal is supplied to a National Television System Committee (NTSC) encoder 27 and converted to a luminance signal (Y) and a chroma signal (C) output by buffer amplifiers 28Y and 28C, respectively, as an S video signal. A composite video signal is output through buffer amplifier 28V as shown. The decoded digital audio signal is converted into an analog audio signal by D/A converter (DAC) 30 which outputs the left audio signal through buffer amplifier 31L and the right audio signal through buffer amplifier 31R. RF modulator 41 mixes the composite video signal with an analog audio signal and converts the mixed signal into an RF output signal.

CPU 29 is the central control mechanism of IRD 12. It executes instructions stored preferably in ROM 37 in order to perform certain system functions. For example, CPU 29 receives and processes user inputs received from front panel buttons or switches 40 of IRD 12 and the photodetector circuit 39 to provide requested user functionality and access. CPU 29 also accesses user settings and preferences, stored in non-volatile memory (NVM) such as electrically erasable programmable read-only memory (EEPROM) 38, for processing of information and configuration of the system. It is understood that the functionality of the electronic program guide as previously described may be provided in the memory of the IRD 12.

FIG. 7 shows a representative remote controller 10. Remote controller 10 is utilized by a user to transmit commands and make program selections in accordance with the teachings of the present invention. Remote controller 10 has an infrared (IR) originating device 50, a set of operation buttons that are controlled by the user 55, a CPU, a ROM, and a RAM, not shown here. Operation buttons 55 include a direction key for pointing the cursor in a horizontal or a vertical direction, a "SELECT" key, a "MENU" key, a "FAVORITE" key, an "EXIT" key, a ten-key alpha-numeric pad, an "ENTER" key, and other function keys known in the art. The CPU of remote controller 10 receives a signal when a user presses an operation button 55 and processes the signal in accordance with a program stored in ROM. The RAM is controlled by the CPU to produce a transmitting code that is sent to IR originating device 50 where it is converted to an IR signal. The IR signal is then transmitted to IRD 12.

It is understood that the functionality of the electronic program guide as previously described may be provided in the memory of the IRD 12 or the memory of remote controller 10.

While the invention has been particularly shown and described with reference to a preferred embodiment, it will be understood by those skilled in the art that various changes in form and detail may be made therein without departing from the spirit and scope of the invention.

What is claimed is:

1. A method for displaying an electronic program guide (EPG) to a viewer of a multiple channel broadcast system, comprising the steps of:

in response to a navigation element of the multiple channel broadcast system remaining stationary over a time block of a plurality of time blocks of the electronic program guide for a predetermined period of time, entering a multiple program display mode in which the time block increases to a first size and the size of the rest of the plurality of time blocks decrease to a second size that is smaller than the first size and channel information for each channel segment of a plurality of channel segments of the time block are displayed on a display screen of the system; and in response to the navigation element of the system moving outside the time block, entering a navigation mode in which the time block decreases in size and the rest of the plurality of time blocks increase in size so that each time block of the plurality of time blocks are of equal size and only a channel information corresponding to a channel segment of the plurality of channel segments of the time block is displayed on the display screen.

2. The method of claim 1, wherein the channel information of the channel segment is a title of a program of the channel segment.

3. The method of claim 1, wherein the channel information corresponding to the channel segment is displayed over the channel segment.

4. The method of claim 1, wherein the navigation element is controlled by a remote control device of the multiple channel broadcast system.

5. The method of claim 1, wherein the navigation element is controlled by a computer of the multiple channel broadcast system.

6. The method of claim 1, wherein the navigation element is controlled by a set-top box of the multiple channel broadcast system.

7. The method of claim 1, wherein the viewer of the multiple channel broadcast system controls movement of the navigation element.

8. A storage media containing a computer program for displaying an electronic program guide (EPG) to a viewer of a multiple channel broadcast system, comprising:

in response to a navigation element of the multiple channel broadcast system remaining stationary over a time block of a plurality of time blocks of the electronic program guide for a predetermined period of time, instructions for entering a multiple program display mode in which the time block increases to a first size and the size of the rest of the plurality of time blocks decrease to a second size that is smaller than the first size and channel information for each channel segment of a plurality of channel segments of the time block are displayed on a display screen of the system; and in response to the navigation element of the system moving outside the time block, instructions for entering a navigation mode in which the time block decreases in size and the rest of the plurality of time blocks increase in size so that each time block of the plurality of time blocks are of equal size and only a channel information corresponding to a channel segment of the plurality of channel segments of the time block is displayed on the display screen.

9. An electronic program guide of a multiple channel broadcast system displayed on a display screen of the system, comprising:

a plurality of time blocks each having a plurality of channel segments, with each channel segment corresponding to a channel a plurality of channels displayed on the display screen; and a navigation element, wherein in response to the navigation element remaining stationary over a time block of the plurality of time blocks for a predetermined period of time, entering a multiple program display mode in which the time block increases to a first size and the size of the rest of the plurality of time blocks decreases to a second size that is smaller than the first size and channel information for each channel segment of the plurality of channel segments of the time block are displayed on the display screen; and in response to the navigation element of the system moving outside the time block, entering a navigation mode in which the time block decreases in size and the rest of the plurality of time blocks increase in size so that each time block of the plurality of time blocks are of equal size and only a channel information corresponding to a channel segment of the plurality of channel segments of the time block is displayed on the display screen.

10. The electronic program guide of claim 9, wherein the channel information of the channel segment is a title of the program of the channel segment.

11. The electronic program guide of claim 9, wherein the channel information corresponding to the channel segment is displayed over the channel segment.

12. The electronic program guide of claim 9, wherein the navigation element is a cursor controlled by a viewer of the multiple channel broadcast system.

13. The electronic program guide of claim 9, wherein the navigation element is controlled by a remote control device of the multiple channel broadcast system.

14. The electronic program guide of claim 13, wherein the navigation element is a cursor.

15. The electronic program guide of claim 9, wherein the navigation element is controlled by a computer of the multiple channel broadcast system.

16. The electronic program guide of claim 15, wherein the navigation element is a cursor.

17. The electronic program guide of claim 9, wherein the navigation element is controlled by a set-top box of the multiple channel broadcast system.

18. The electronic program guide of claim 17, wherein the navigation element is a cursor.

19. An electronic program guide of a multiple channel broadcast system displayed on a display screen of the system, comprising:

a plurality of time blocks each having a plurality of channel segments, with each channel segment corresponding to a channel of a plurality of channels displayed on the display screen;

a navigation element;

means for entering a multiple program display mode in which the time block increases to a first size and the size of the rest of the plurality of time blocks decreases to a second size that is smaller than the first size and channel information for each channel segment of the plurality of channel segments of the time block are displayed on the display screen, in response to the navigation element remaining stationary over a time block of the plurality of time blocks for a predetermined period of time; and means for entering a navigation mode in which the time block decreases in size and the rest of the plurality of time blocks increase in size so that each time block of the plurality of time blocks are of equal size and only a channel information corresponding to a channel segment of the plurality of channel segments of the time block is displayed on the display screen, in response to the navigation element of the system moving outside the time block.

20. A multiple channel broadcast system capable of providing an electronic program guide (EPG) to a viewer of the multiple channel broadcast system, comprising:

a display screen that displays the electronic program guide, wherein the electronic program guide comprises:
a plurality of time blocks each having a plurality of channel segments, with each channel segment corresponding to a channel of a plurality of channels displayed on the display screen; and
a navigation element;

an antenna for receiving one or more channel to be displayed on the display screen;

an integrated receiver/decoder (IRD) having a computer program that is operatively coupled to the display screen and the antenna; and a remote control device operatively coupled to the computer program of the IRD that controls navigation of the navigation element, wherein in response to the navigation element remaining stationary over a time block of the plurality of time blocks for a predetermined period of time, entering a multiple program display mode in which the time block increases to a first size and the size of the rest of the plurality of time blocks decreases to a second size that is smaller than the first size and channel information for each channel segment of the plurality of channel segments of the time block are displayed on the display screen, and in response to the navigation element of the system moving outside the time block, entering a navigation mode in which the time block decreases in size and the rest of the plurality of time blocks increase in size so that each time block of the plurality of time blocks are of equal size and only a channel information corresponding to a channel segment of the plurality of channel segments of the time block is displayed on the display screen.

21. The system of claim 20, wherein the channel information of the channel segment is a title of the program of the channel segment.

22. The system of claim 20, wherein the channel information corresponding to the channel segment is displayed over the channel segment.

23. The system of claim 20, wherein the navigation element is a cursor controlled by a viewer of the multiple channel broadcast system.

* * * * *